United States Patent [19]

Oohashi

[11] Patent Number: 4,918,528
[45] Date of Patent: Apr. 17, 1990

[54] CONTOUR CORRECTION DEVICE

[75] Inventor: Tomonori Oohashi, Nagaokakyo, Japan

[73] Assignee: Mitsubishi Denki Kabushiki Kaisha, Tokyo, Japan

[21] Appl. No.: 304,846

[22] PCT Filed: May 20, 1988

[86] PCT No.: PCT/JP88/00480
§ 371 Date: Feb. 17, 1989
§ 102(e) Date: Feb. 17, 1989

[87] PCT Pub. No.: WO88/09592
PCT Pub. Date: Dec. 1, 1988

[30] Foreign Application Priority Data

May 25, 1987 [JP] Japan ............... 62-127831

[51] Int. Cl.$^4$ ............................................ H04N 5/208
[52] U.S. Cl. ..................... 358/162; 358/37; 358/96; 358/166
[58] Field of Search ............. 358/37, 96, 162, 166

[56] References Cited

U.S. PATENT DOCUMENTS

| 4,677,461 | 6/1987 | Mizutani et al. | 358/166 |
| 4,698,673 | 10/1987 | Johnson | 358/166 |
| 4,706,113 | 11/1987 | Ito et al. | 358/37 |
| 4,758,891 | 7/1988 | Hitchcock et al. | 358/166 |
| 4,839,725 | 6/1989 | Ueda | 358/162 |

FOREIGN PATENT DOCUMENTS

| 16923 | 2/1979 | Japan. | |
| 292776 | 11/1988 | Japan. | |
| 302675 | 12/1988 | Japan. | |
| 64-24681 | 1/1989 | Japan. | |
| 562948 | 6/1977 | U.S.S.R. | 358/162 |

Primary Examiner—John W. Shepperd
Assistant Examiner—Michael D. Parker

[57] ABSTRACT

In order to attain a higher sharpness of a television image by improving the transient of signals corresponding to the contour portion of the image, an input signal and two other signals obtained through delaying the input signal are used such that the transient portion is detected through computation of these three signals and one of these three signals is selected and output. According to this arrangement, the sharpness and the fineness of the input image can be improved without being accompanied by image saturation.

6 Claims, 4 Drawing Sheets

CONTOUR CORRECTION DEVICE

TECHNICAL FIELD

This invention relates to a contour control device for improving sharpness or fineness of image signals used in color television receivers, video tape recorders and so forth.

BACKGROUND ART

FIG. 3 illustrates the manner in which the state of rise of a stepped waveform is improved by a known edge stressing method, disclosed in an article entitled as "A Method of Computing Sharpness of Television Image" appearing in the Gazette of Society of Electro-Communication Engineering" (July 1983, Vol. J66-B No. 7).

It is well known that the sharpness of a television image can be improved by enhancing contour portions of the image, and this method is widely applied to luminance signals which determine the shape of an object.

A typical known correction means capable of enhancing contour portions of an image is arranged, as shown in FIG. 3, such that a signal obtained by quadratic differentiation of an original signal waveform is multiplied with a certain coefficient and the product of the multiplication is added to the original signal waveform.

Referring to this Figure, more specifically, a stepped waveform $I_2(=Q(x))$, which is an original signal obtained through a band restriction in a transmission path, is subjected to a quadratic differentiation so that a quadratic-differentiated waveform $Q''(x)$ is obtained. Then, the quadratic-differentiated waveform $Q''(x)$ is multiplied with a coefficient -a so that a waveform Id is obtained. The signal Id thus obtained is added to the original signal waveform $I_2$, whereby a contour correction signal waveform $I_2+Id$ is obtained.

The amount of improvement in the rise time achieved by this contour correction means is expressed in terms of time relative to the amount of change in the amplitude. In the case of the original waveform $I_2$, the amount of improvement is expressed as $V_1/X_1$, whereas, in the case of the contour correction signal waveform $I_2+Id$, the amount of improvement is $V_2/X_2$. It will be seen that the rise time is improved appreciably.

The improvement in the rise of signals corresponding to the contour portions of a television image, i.e., enhancing of contour portions, provides a higher sharpness of the image.

In the known contour correction means, the correction signal is obtained by determining the quadratic-differentiated value of the original waveform, multiplying this value with a coefficient, and adding the product of the multiplication to the original waveform. Thus, as represented by hatched portions in FIG. 3, the level of the correction signal waveform exceeds the level of the original signal waveform so that saturation of the waveform may take place when the amplitude of the original waveform coincides with the maximum amplitude of the dynamic range of the transmission path.

DISCLOSURE OF THE INVENTION

Accordingly, an object of the present invention is to overcome the above-described problems of the prior art, by providing a contour correction device which is capable of improving the sharpness of an image by enhancing the contour portion of the image without causing any saturation of an original signal waveform.

To this end, according to the present invention, there is provided a contour correction device comprising: first delay means for delaying an input signal by a predetermined time; second delaying means for delaying the input signal by a time which is longer than the delay time provided by the first delaying means; means for computing the absolute value A of the difference in the amplitude between the output signal from the first delay means and the input signal; means for computing the absolute value B of the difference in the amplitude between the output signal from the first delay means and the output signal from the second delay means; and means for comparing the absolute values A and B and for producing an output signal representative of the result of the comparison. The device further comprises means for computing the absolute value $C=/A-B/$ of the difference between the absolute values A and B; means for comparing the absolute value C with a threshold value N and for producing an output signal representative of the result of the comparison; and means for selectively outputting, in accordance with the two comparison results, one of the input signal, the output signal from the first delay means and the output signal from the second delay means.

The means for selectively outputting one of three signals selects the input signal throughout a period in which both the conditions $C>N$ and $A<B$ are simultaneously met, the output signal from the first delay means throughout a period in which the condition of $C<N$ is met, and the output signal from the second delay means throughout a period in which both the conditions $C>N$ and $A>B$ are simultaneously met.

As a result, in the rising portion of a signal, the signal having a comparatively low level and a large delay time is changed to a signal of a comparatively high level and having no delay past a signal of a small delay, whereby the rise time is shortened. A similar selection is performed also in the falling portion of the signal so that the falling time is shortened. It is thus possible to obtain a contour-stressed signal without causing the amplitude to exceed the amplitude of the input signal. In addition, the amount of change in the level at the time of switch-over of the signal is reduced to improve the transient response characteristic.

According to the invention, one of the three signals including the original input signal, the signal which is advanced from the original signal by a predetermined time and the signal which is delayed from the original signal by a predetermined time is selectively output. The selection of the output is in accordance with the result of comparison between the absolute values A and B of differences in the amplitude between the original signal and the signals advanced and delayed from the original signal, and the result of the comparison between the absolute value $C=/A-B/$ between these absolute values A and B, and a threshold value N. In consequence, it is possible to obtain a contour correction device in which the sharpness and fineness of the input image signal is improved and, at the same time, the amount of change in the level at the switch-over of the signal is reduced so as to also improve the transient response characteristic while correcting the contour portions of the image signal without causing any saturation even when the input signal has a large amplitude.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

BEST MODE FOR CARRYING OUT THE INVENTION

Figure 1:
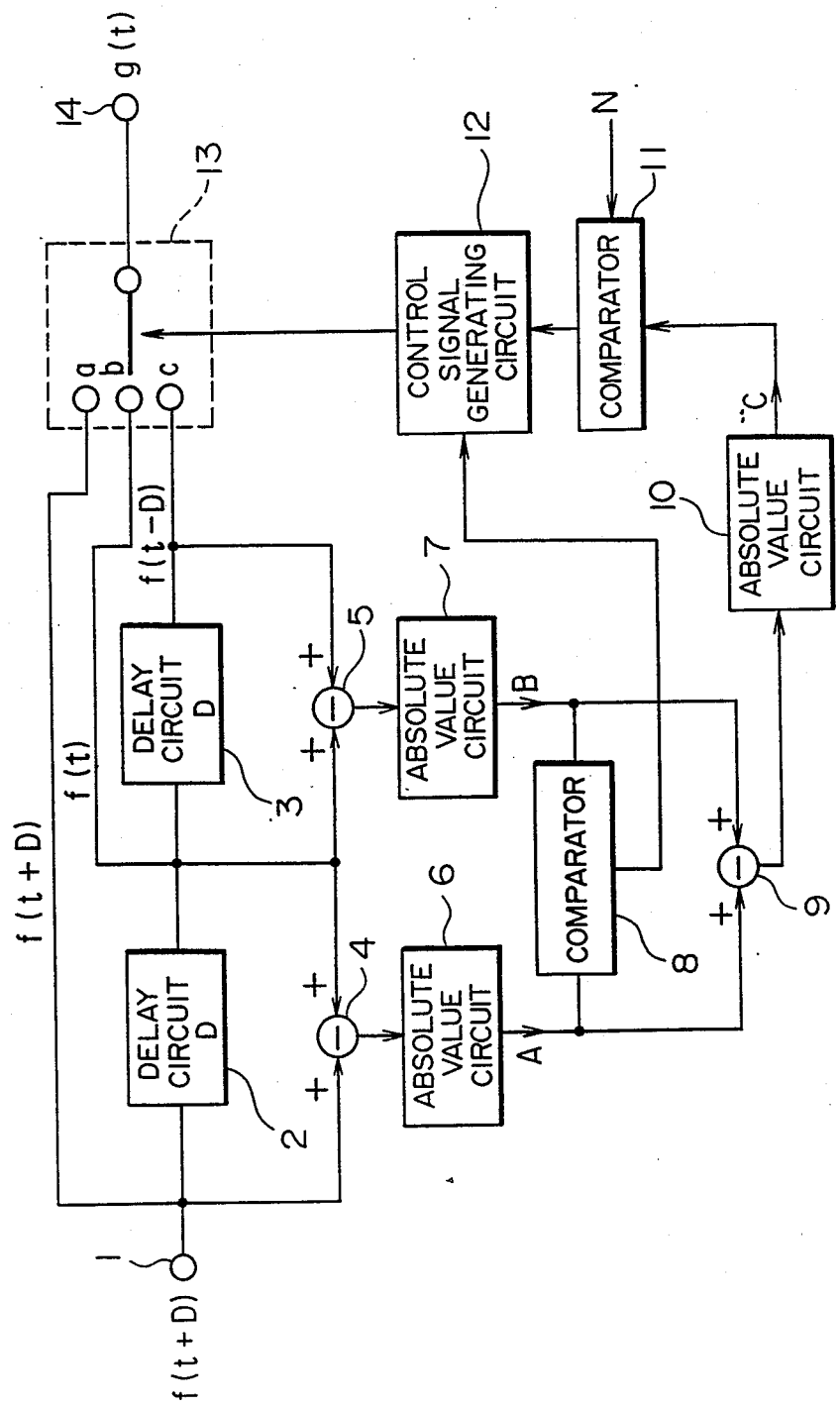
FIGS. 1 and 4 are block diagrams of embodiments of the present invention.

FIG. 1 is a block diagram of an embodiment of the present invention. Referring to the drawing, the first embodiment of the present invention has the following parts: an input terminal 1 through which a luminance signal is input, delay circuits 2, 3 through which the input signal is delayed by a predetermined time D, a subtracter 4 for computing the difference in the amplitude between an output signal from the delay circuit 2 and the input signal at every moment, and a subtracter 5 for computing the difference in the amplitude between the output signal from the delay circuit 2 and an output signal from the delay circuit 3. The system also comprises an absolute value circuit 6 for producing an output signal representative of the absolute value A of the output signal from the subtracter 4, an absolute value circuit 7 for producing an output signal representative of the absolute value B of the output signal from the subtracter 5, a comparator 8 for comparing the output signals A and B from the absolute value circuits 6 and 7 and for delivering the result of the comparison to a later-mentioned control signal generating circuit 12, a subtracter 9 for computing the difference between the absolute values A and B, an absolute value circuit 10 for producing an output signal representative of the absolute value C of the difference between the absolute values A and B, and a comparator 11 for comparing the absolute value C with a predetermined threshold value N and for delivering the result of the comparison to the later-mentioned control signal generating circuit 12. The control signal generating circuit 12 is for producing a change-over signal in accordance with the two comparison results delivered thereto, and the system further comprises a change-over switch 13 operative in accordance with the change-over signal so as to selectively deliver one of the input signals, i.e., the output signal from the delay circuit 2 or the output signal from the delay circuit 3 to an output terminal 14.

The operation of this embodiment will be described hereinunder.

Figure 2:
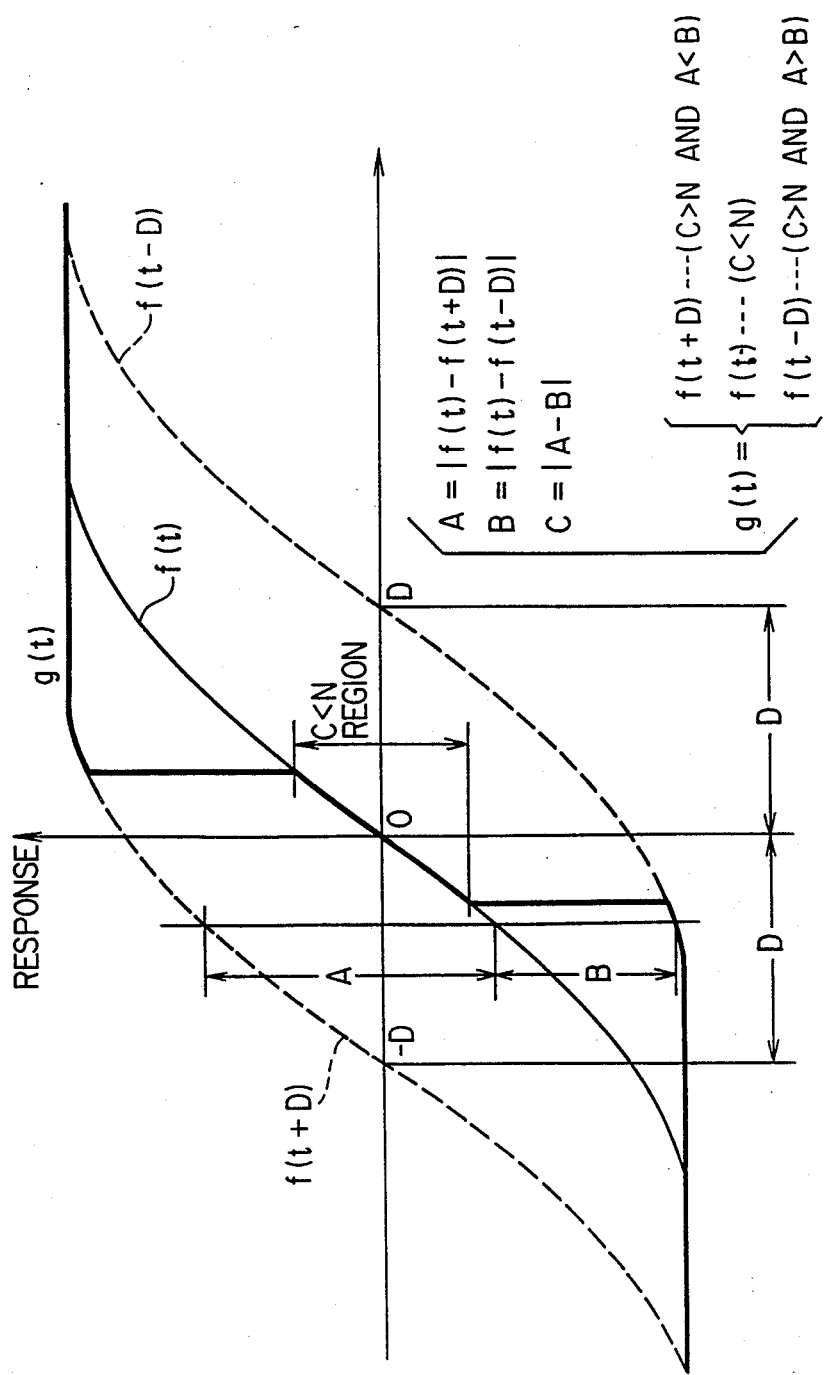
FIG. 2 is a waveform chart illustrative of waveforms of signals available at various portions of the embodiments for the purpose of explaining the operation of the embodiments.
Figure 3:
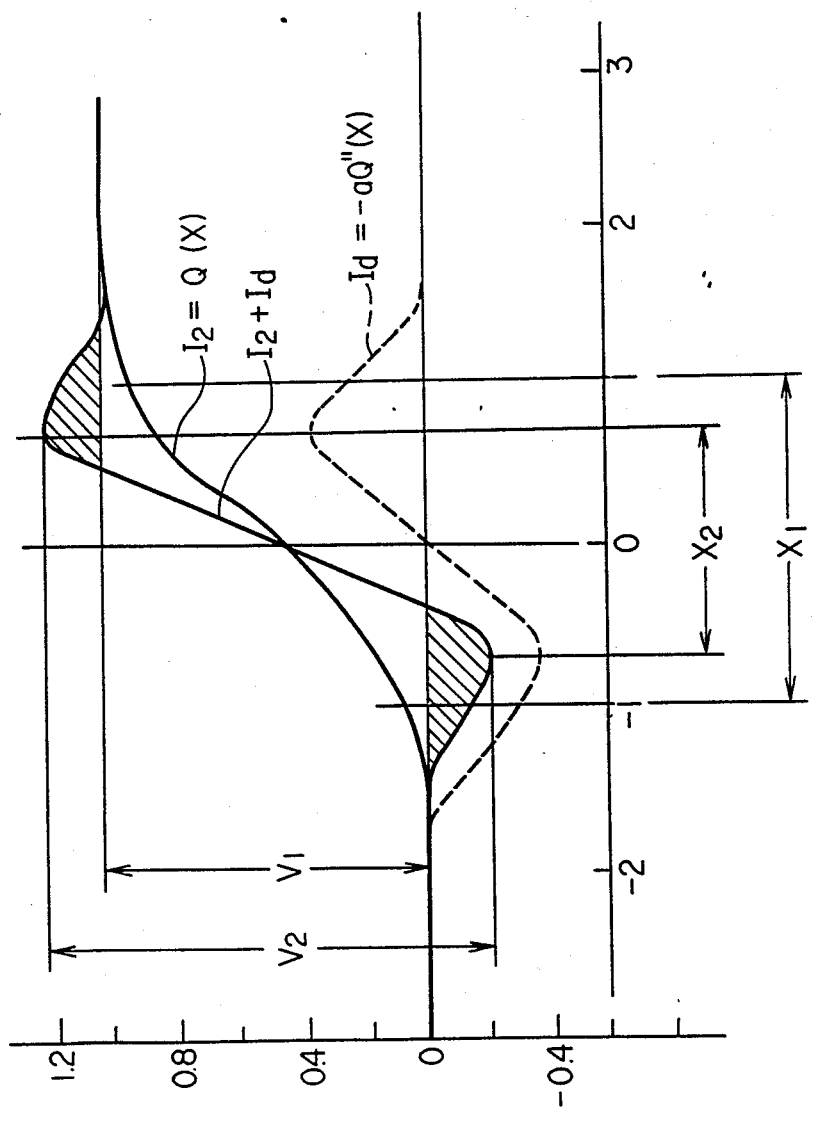
FIG. 3 is a waveform chart illustrative of the waveform processing performed in a known contour correction means.

An input signal input through the input terminal 1 is delayed by a time D through the delay circuit 2 and is further delayed by the time D through the delay circuit 3. Therefore, three terminals a, b and c of the change-over switch 13 simultaneously receive, respectively, three signals, i.e., the present input signal, a signal which was input at an instant which is ahead of the present instant by the time D and a signal which was input at an instant which is ahead of the present instant by the time 2D. Representing the output signal from the delay circuit 2 by f(t), the present input signal is represented by f(t+D), while the output signal from the delay circuit 3 is represented by f(t−D). FIG. 2 shows positional relationships of these three signals. The subtracter 4 momentarily computes (amplitude of the signal f(t)—amplitude of the signal f(t+D)) (referred to as [f(t)−f(t+D)]), and the absolute value A of the result of the subtraction is output from the absolute value circuit 6. Meanwhile, the subtracter 5 computes f(t)−f(t−D) and the absolute value B of the result of this subtraction is output through the absolute value circuit 7. The comparator 8 conducts the comparison between the absolute values A and B. When the condition of A<B or A>B is met, the comparator 8 delivers an output indicative of the result of the comparison. The subtracter 9 computes the difference A−B between the absolute values A and B and the absolute value C=/A−B/ of the difference is output from the absolute value circuit 10. The comparator 11 compares the absolute value C with a predetermined threshold value N, and delivers an output indicative of the result of the comparison when the condition of C>N or C<N is met. The control signal generating circuit 12 connects the change-over switch 13 to the terminal a so as to output the signal f(t+D) throughout a period in which both the conditions C>N and A<B are met, to the terminal b so as to output the signal f(t) when the condition C<N is met, and to the terminal c so as to output the signal f(t−D) when both the conditions C>N and A>B are met. As a result, the output terminal 14 delivers a signal g(t) represented by a thick line in FIG. 2. The signal g(t) has a waveform which is obtained by correcting the input signal f(t) having a long rise time into a signal of a waveform having a quick rising characteristic. In addition, the amplitude of this signal g(t) never does exceed the amplitude of the original signal, so that occurrence of waveform saturation is avoided.

The computations performed in the described embodiment are expressed by the following formulae:

$$A = /f(t) - f(t+D)/ \tag{1}$$

$$B = /f(t) - f(t-D)/ \tag{2}$$

$$C = /A - B/ \tag{3}$$

On the other hand, the output signal g(t) is represented by the following formula:

$$g(t) = \begin{bmatrix} f(t + D) \ldots \text{(on conditions of } C > N \text{ and } A < B) \\ f(t) \ldots \text{(on condition of } C < N) \\ f(t - D) \ldots \text{(on conditions of } C > N \text{ and } A > B) \end{bmatrix}$$

Although the described embodiment processes a time-continuous signal, i.e., an analog signal waveform, the invention provides the same effect also when applied to discrete signals, i.e., digital waveforms.

Figure 4:
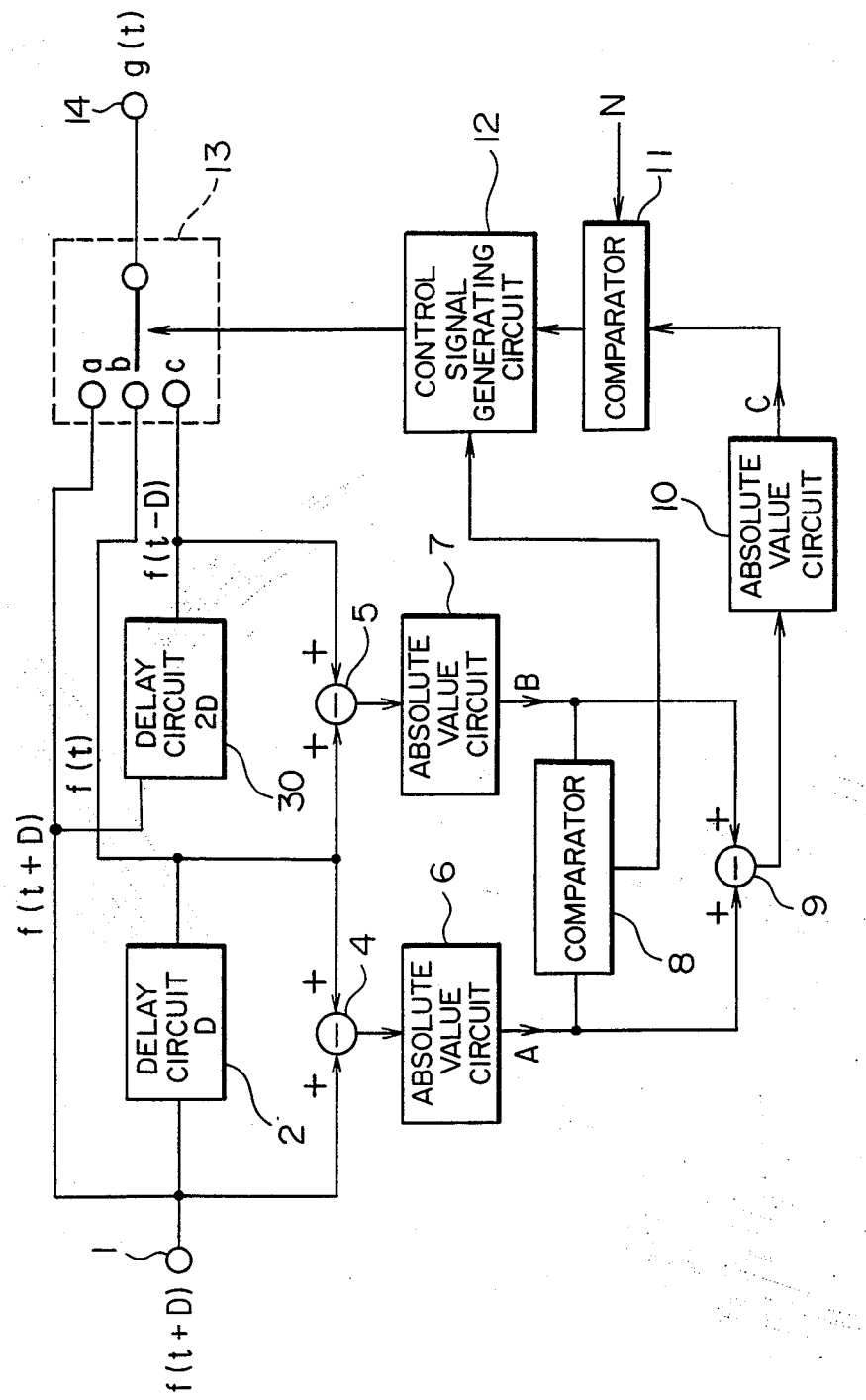

In the described embodiment, three sequential signals which are delayed by a time D one after another are formed by making use of two delay circuits 2 and 3 each producing a time delay D. This, however, is only illustrative and the three signals may be formed as shown in FIG. 4 by means of a first delay circit 2 having a delay time D and a second delay circuit 30 having a delay time 2D.

It is also to be noted that the delay times or time intervals between the three signals may be different from each other though in the described embodiment a constant delay time D exists between the three signals one after another.

INDUSTRIAL APPLICABILITY

The present invention is applicable to various apparatus which processes television signals, such as color television receivers, video tape recorders and so forth, as well as video disk players.

What is claimed:

1. A contour correction device comprising:
   first delay means for delaying an input image signal by a first predetermined delay time;
   second delay means for delaying said input image signal by a second predetermined delay time which is longer than said first predetermined delay time;
   means for computing an absolute value A of the difference in the amplitude between an output signal from said first delay means and said input image signal;
   means for computing an absolute value B of the difference in the amplitude between said output signal from said first delay means and an output from the second delay means;
   first comparison means for comparing said absolute values A and B and for producing an output signal representative of the result of the comparison throughout a period in which a condition A<B or A>B is met;
   means for computing an absolute value C of the difference between said absolute values A and B;
   second comparison means for comparing said absolute value C with a threshold value N and for producing an output signal representative of the result of the comparison throughout a period in which a condition of C>N or C<N is met; and
   means for outputting a contour enhanced image signal, said means selectively outputting, in accordance with the two comparison results,
      said input image signal throughout a period in which both the conditions C>N and A<B are simultaneously met,
      said output signal from said first delay means throughout a period in which the condition of C<N is met, and
      said output signal from said second delay means throughout a period in which both the conditions C>N and A>B are simultaneously met.

2. The contour correction device of claim 1 wherein said second predetermined delay time is twice as long as said first predetermined delay time.

3. A contour correction device comprising:
   first delay means for delaying an input image signal by a predetermined delay time;
   second delay means for delaying an output signal of said first delay means by said predetermined delay time;
   means for computing an absolute value A of the difference in the amplitude between an output signal from said first delay means and said input image signal;
   means for computing an absolute value B of the difference in the amplitude between said output signal from said first delay means and an output from the second delay means;
   first comparison means for comparing said absolute values A and B and for producing an output signal representative of the result of the comparison throughout a period in which a condition A<B or A>B is met;
   means for computing an absolute value C of the difference between said absolute values A and B;
   second comparison means for comparing said absolute value C with a threshold value N and for producing an output signal representative of the result of the comparison throughout a period in which a condition of C>N or C<N is met; and
   means for outputting a contour enhanced image signal, said means for selectively outputting, in accordance with the two comparison results,
      said input image signal throughout a period in which both the conditions C>N and A<B are simultaneously met,
      said output signal from said first delay means throughout a period in which the condition of C<N is met, and
      said output signal from said second delay means throughout a period in which both the conditions C>N and A>B are simultaneously met.

4. A method of contour correction comprising the steps of:
   delaying an input image signal by a first predetermined delay time in a first delay means;
   delaying said input image signal by a second predetermined delay time, which is longer than said first predetermined delay time, in a second delay means;
   computing an absolute value A of the difference in the amplitude between an output signal from said first delay means and said input image signal;
   computing an absolute value B of the difference in the amplitude between said output signal from said first delay means and an output from the second delay means;
   comparing said absolute values A and B and producing an output signal representative of the result of the comparison throughout a period in which a condition A<B or A>B is met;
   computing an absolute value C of the difference between said absolute values A and B;
   comparing said absolute value C with a threshold value N and producing an output signal representative of the result of the comparison throughout a period in which a condition of C>N or C<N is met; and
   outputting a contour enhanced image signal by selectively outputting, in accordance with the two comparison results,
      said input image signal throughout a period in which both the conditions C>N and A<B are simultaneously met,
      said output signal from said first delay means throughout a period in which the condition of C<N is met, and
      said output signal from said second delay means throughout a period in which both the conditions C>N and A>B are simultaneously met.

5. The method of contour correction of claim 4 wherein said second predetermined delay time is twice as long as said first predetermined delay time.

6. A method of contour correction comprising the steps of:
   delaying an input image signal by a predetermined delay time in a first delay means;

delaying an output signal of said first delay means, by said predetermined delay time, in a second delay means;

computing an absolute value A of the difference in the amplitude between an output signal from said first delay means and said input image signal;

computing an absolute value B of the difference in the amplitude between said output signal from said first delay means and an output from the second delay means;

comparing said absolute values A and B and producing an output signal representative of the result of the comparison throughout a period in which a condition $A<B$ or $A>B$ is met;

computing an absolute value C of the difference between said absolute values A and B;

comparing said absolute value C with a threshold value N and producing an output signal representative of the result of the comparison throughout a period in which a condition of $C>N$ or $C<N$ is met; and outputting a contour enhanced image signal by selectively outputting, in accordance with the two comparison results, said input image signal throughout a period in which both the conditions $C>N$ and $A<B$ are simultaneously met, said output signal from said first delay means throughout a period in which the condition of $C<N$ is met, and said output signal from said second delay means throughout a period in which both the conditions $C>N$ and $A>B$ are simultaneously met.

* * * * *